(12) United States Patent
Graslund et al.

(10) Patent No.: US 8,745,994 B2
(45) Date of Patent: Jun. 10, 2014

(54) METHOD AND DEVICE FOR COOLING

(75) Inventors: Jonas Graslund, Hasselby (SE);
Gunnar Nordberg, Nacka (SE)

(73) Assignee: Skanska Kommersiell Utveckling Norden AB, Solna (SE)

( * ) Notice: Subject to any disclaimer, the term of this patent is extended or adjusted under 35 U.S.C. 154(b) by 895 days.

(21) Appl. No.: 12/805,099

(22) Filed: Jul. 12, 2010

(65) Prior Publication Data
US 2011/0048037 A1  Mar. 3, 2011

(30) Foreign Application Priority Data
Jul. 13, 2009  (SE) ...................................... 0950553

(51) Int. Cl.
*F25B 7/00* (2006.01)

(52) U.S. Cl.
USPC ................................................ 62/79; 62/260

(58) Field of Classification Search
CPC ............... F25F 5/0017; F28D 20/0052; F28D 20/0056; F24F 2005/0057; F24F 5/0046; Y02E 60/142; Y02E 60/147; Y02B 10/40; Y02B 10/24; Y02B 10/20
USPC ............. 62/79, 260, 238.1, 236; 165/45, 48.2
See application file for complete search history.

(56) References Cited

U.S. PATENT DOCUMENTS

| | | | |
|---|---|---|---|
| 3,339,329 A | 9/1967 | Berg | |
| 3,339,629 A | 9/1967 | Hervey | |
| 3,965,972 A * | 6/1976 | Petersen | 165/45 |
| 4,054,126 A * | 10/1977 | Ervin, Jr. | 126/619 |
| 4,081,024 A * | 3/1978 | Rush et al. | 165/62 |
| 4,129,177 A * | 12/1978 | Adcock | 165/48.2 |

(Continued)

FOREIGN PATENT DOCUMENTS

| DE | 102007037474 A1 | 2/2009 |
|---|---|---|
| EP | 1388717 A1 | 2/2004 |

(Continued)

OTHER PUBLICATIONS

Office Action dated Feb. 28, 2011 issued in corresponding Swedish Appln. No. 0950553-8.3.

(Continued)

*Primary Examiner* — Mohammad M Ali
(74) *Attorney, Agent, or Firm* — Harness, Dickey & Pierce, P.L.C.

(57) ABSTRACT

The present invention relates to a method for cooling an indoor environment in a house with the aid of a cooling plant, and to a cooling plant for cooling an indoor environment. The cooling plant comprises a cold store in the form of a rock store, a cooling system for cooling the indoor environment and a cooling medium for transport of cold. The cooling plant has only one cooling mode and only one charging mode. In cooling mode, the cooling medium is cooled with cold from the rock store and the cooling system is fed only with cooling medium cooled only with cold from the rock store. In charging mode, the cooling medium is cooled only with outside air and/or ground cold and the rock store is cooled only with the cooling medium cooled only by outside air and/or ground cold.

24 Claims, 7 Drawing Sheets

(56) References Cited

U.S. PATENT DOCUMENTS

| | | | | |
|---|---|---|---|---|
| 4,143,705 | A | * | 3/1979 | Awalt, Jr. ............... 165/48.2 |
| 4,175,541 | A | * | 11/1979 | Midgley ................. 126/630 |
| 4,346,569 | A | | 8/1982 | Yuan |
| 4,375,831 | A | | 3/1983 | Downing, Jr. |
| 4,452,227 | A | * | 6/1984 | Lowrey, III ............ 126/567 |
| 4,452,229 | A | * | 6/1984 | Powers .................. 126/632 |
| 4,566,281 | A | * | 1/1986 | Sandrock et al. ....... 62/46.3 |
| 6,233,951 | B1 | | 5/2001 | Cardill |
| 2007/0000406 | A1 | | 1/2007 | Stout |
| 2007/0223999 | A1 | * | 9/2007 | Curlett .................... 405/55 |

FOREIGN PATENT DOCUMENTS

| | | |
|---|---|---|
| EP | 1 772 681 | 4/2007 |
| GB | 2334089 A | 8/1999 |
| WO | WO 2007/053951 | 5/2007 |
| WO | WO 2009/050795 | 4/2009 |

OTHER PUBLICATIONS

European Search Report issued in European Application No. 10168284.7, dated Feb. 27, 2013.

* cited by examiner

METHOD AND DEVICE FOR COOLING

TECHNICAL FIELD OF THE INVENTION

The present invention relates to a method and a cooling plant for cooling an indoor environment in a house.

TECHNICAL BACKGROUND OF THE INVENTION

Many different methods and plants for cooling an indoor environment in a house are currently on the market. Such systems are often based on the cooling of supply air or on the fact that a cooling element placed in the house is kept cold.

Examples of systems in which the supply air is cooled are air conditioning systems. One problem with such systems is that they comprise energy-intensive air conditioning units and cooling machines. Another problem is that they often also comprise complex regulating systems.

Another example is rock heating systems. When it is warm in the summer, rock heating systems can be used so that the house is provided with cold from the rock which has become cold during the winter when heat has been removed from it. Many of the rock heating systems which have been used as cooling systems in the summer utilize a traditional air conditioning system located in the house. Cold water is cooled with the aid of cold from the rock and a heat pump operating as a cooling machine, and is supplied to the air conditioning system of the house for cooling of the indoor environment. One problem with rock heating systems is that they comprise a large number of complex components, such as at least one heat pump comprising one or more energy-intensive compressors. Another problem is that they often comprise advanced regulating and control systems. Furthermore, as much heat as possible is often extracted from the rock during the winter and, in addition, the rock is often cooled further to enable it to act as a cold source throughout the summer, which means that the rock is cooled down to several degrees below zero when it is coldest. Since the rock, of course, holds a temperature of 5-6° C., this implies a strain upon the environment. Sub-zero degrees deep down in the ground can damage, for example, seeds and insects in the ground. It is also difficult to keep the store so cold without cold leaking out into surrounding rock.

In many known plants and methods, there are therefore problems with complex systems which often fall apart, are difficult to repair and which are complicated to regulate.

SUMMARY OF THE INVENTION

The object of the present invention is to at least alleviate some of the above problems and to provide a method and an improved plant of the type defined in the introduction.

This object is achieved by means of the method according to patent Claim 1 and by means of the plant according to patent Claim 15. Advantageous embodiments of the invention are defined in the sub-claims.

The invention is thus realized according to a first aspect by means of a method for cooling an indoor environment in a house with the aid of a cooling plant. The cooling plant comprises a cold store in the form of a rock store, a cooling system for cooling the indoor environment and a cooling medium for transport of cold, the cooling plant having only one cooling mode and only one charging mode. The method comprises the steps of, in cooling mode, cooling the cooling medium with cold from the rock store, feeding the cooling system only with cooling medium cooled only with cold from the rock store, and, in charging mode, cooling the cooling medium with outside air and/or ground cold, and cooling the rock store only with the cooling medium cooled only by outside air and/or ground cold.

According to a second aspect of the invention, a cooling plant is provided for cooling an indoor environment in a house, which cooling plant has only one cooling mode and only one charging mode. The cooling plant comprises a cooling system, a cold store in the form of a rock store, and a cooling medium for transport of cold. The cooling plant is arranged such that, in cooling mode, the cooling medium is exposed to cold only from the rock store for cooling of the cooling medium, the rock store is connected to the cooling system for transport of only cooling medium cooled only by the rock store from the rock store to the cooling system for cooling of the indoor environment, and such that, in charging mode, the cooling medium is exposed to cold from only outside air and/or ground for cooling of the cooling medium, and the rock store is connected to the cooling medium cooled by cold from only the outside air and/or the ground, for transport of only the cooling medium cooled by cold from only the outside air and/or the ground to the rock store for cooling of the rock store.

The invention is thus based on an insight that it is possible to drive a cooling plant with a cooling medium which is solely cooled by cold from a rock store, even if the rock store has not actively been cooled with other than outside air and/or ground cold. By virtue of the fact that all cold in the system thus emanates from the rock store, cold outside air and/or cold ground, it is possible according to the invention to wholly dispense with cooling machines such as heat pumps or air conditioning units. Since the invention furthermore, in cooling mode, operates with only one cold source, namely the cold store, the plant according to the invention is easier to control and regulate than known plants in which cooling machines must be controlled and made to interact with any cold from rock, etc. The invention thus provides a simpler system which comprises fewer complex units and which is easier to control.

The invention relates to cooling of an indoor environment in a house. The term "house" is intended to cover all types of buildings which contain one or more room areas delimited by floor, walls and ceiling for differentiation between room areas with different climates, which essentially are situated above ground and which primarily are intended for homes or premises, for example commercial premises such as office premises or business premises. The term "indoor environment" relates to room areas inside the house and comprises, for example, the air inside a room. The term "outside air" relates to air which is found outside the house. The term "ground cold" relates to cold which is found in the upper strata in the ground, such as cold from the earth close to the ground surface.

The invention comprises a cold store in the form of a rock store, which can be of any chosen type, such as, for example, a borehole store or a store comprising one or more cavities.

According to the invention, cold can be stored in the rock store in any chosen manner, such as, for example, in a storage fluid or in the rock itself. The storage fluid can be arranged in cavities in the rock store, it can be substantially still or arranged to circulate. The storage fluid can be any chosen suitable gas, such as air, or a suitable liquid, such as water with or without additives. One possible type of additive is anti-freeze, such as, for example, ethanol. In case of storage in rock, the storage fluid can be arranged for the transfer of cold to the rock itself via boreholes.

According to one embodiment of the invention, the rock store is a borehole store in which tubes have been placed in the boreholes. Circulating in the tubes is a storage fluid in the form of water without added anti-freeze. An advantage with this is that, should the rock store leak, then only water which is harmless to the environment leaks out.

The invention can comprise a cooling medium of any chosen suitable type, such as, for example, a suitable liquid, for example water with or without additives. According to one embodiment of the invention, the cooling medium is water with additives of anti-freeze, such as ethanol. This embodiment is advantageous, since the cooling medium then does not freeze as easily when the temperature is below zero in winter and the invention operates in cooling mode. Other embodiments in which the cooling medium is constituted by water without anti-freeze are advantageous due to the fact that they essentially do not impact upon the environment in case of possible leakage and that they facilitate operation and maintenance.

The invention comprises a cooling system. Normally the cooling system comprises a number of different components for transport of the cooling medium from the cold source to the indoor environment to be cooled. Examples of components in a cooling system according to the invention are pipe lines, tubes or the like for transport of the cooling medium, pumps for feeding of the cooling medium, and valves for guidance of the cooling medium to different lines in the cooling system and/or regulation of the flow, for example velocity and volume, of the cooling medium. The cooling system can also comprise measuring devices for measuring flows and/or temperatures and a control device for controlling the cooling system, for example by regulating the path and flows of the cooling medium. The control device can control the cooling system such that a desired cooling of the indoor environment is obtained. This control can be realized with or without feedback of, for example, temperatures of the indoor environment, the temperature of the cooling medium in the cooling position, or other suitable reference values. The cooling system can also comprise an energy source such as a generating set, or can be connected to mains current for driving of pumps, valves, etc. in the cooling system.

According to one embodiment of the invention, the cooling system comprises at least one heat exchanger device. By the term "heat exchanger device" is meant a device for transferring cold from one medium to another. Usually a first medium is cooled by a second medium, by virtue of the fact that heat is transferred from the first medium to the, at least from the start, colder, second medium. The heat exchanger device can be of any chosen type, for example of any construction which is known per se, comprising mutually adjacent pipes containing, alternately, the one and the other medium, or metal plates, inside which a first medium flows and which on the outer side have contact with a second medium. The heat exchanger device can be arranged to transfer cold between liquids, gases or between a liquid and a gas.

The invention can comprise a cooling heat exchanger device for transferring cold from the cooling medium to air for cooling of the indoor environment, a storage heat exchanger device for transferring cold from the storage liquid to the cooling medium, and/or a charging heat exchanger device for transferring cold from the outside air to the cooling medium and/or for transferring cold from the ground to the cooling medium. Each heat exchanger device can here comprise one or more units situated close together or far apart. For example, the charging heat exchanger device can comprise a first heat exchanger device for transferring cold from the outside air to the cooling medium in the form of a conventional heater battery, and a second heat exchanger device for transferring cold from the ground to the cooling medium in the form of line loops, containing cooling medium, buried in the surface layers of the ground. The cooling plant according to the invention often also comprises a plurality of cooling heat exchanger devices, usually at least one cooling heat exchanger device being placed in each room in the house which is to be cooled, for example one cooling heat exchanger device in each office room when the plant is installed in an office premises.

According to the invention, the indoor environment can thus be cooled with the aid of a cooling heat exchanger device which transfers cold from the cooling medium direct to the air in the indoor environment. According to the invention, the indoor environment, however, can also be cooled differently, for example by a transfer of cold to walls or other bodies in the indoor environment by the cooling medium. Sometimes these bodies can then, in turn, be used for cooling the air in the indoor environment. It is also possible to have ventilation air pass through a body cooled by the cooling medium, such as a cooling heat exchanger device, which can be placed in the indoor environment or separately at a distance therefrom, for cooling of the ventilation air before it flows out into the indoor environment.

According to the invention, outside air intended as ventilation air can be used to cool the cooling medium in charging mode.

According to one embodiment of the invention, at least parts of the cooling system, especially at least one cooling heat exchanger device, are removably installed in the house in which the indoor environment is to be cooled. This is advantageous, since the cooling system can then be installed in existing houses and its parts can then easily be dismantled for maintenance or for replacement during radical reconstruction or renovation.

According to the invention, the cooling plant has a cooling mode and a charging mode. The invention is thus arranged to be able to operate in cooling mode for cooling of the indoor environment, and in charging mode for charging of the rock store with cold. The invention can be arranged to operate in either cooling mode or in charging mode, or in both cooling mode and charging mode simultaneously. Usually, the invention operates in cooling mode in summer time and in charging mode in winter time. In regions in which it is warm for large parts of the year and in which cooling of the indoor environment is also desired for large parts of the year, the invention can be in cooling mode by day and in charging mode at night. One advantage with this is that the cold in the rock store lasts longer. Sometimes it can be significantly warmer indoors than outdoors and in this case it may be possible for the invention to be in cooling mode and charging mode simultaneously.

According to the invention, the cooling plant has only one cooling mode and only one charging mode. This means that the invention is limited with respect to possible working methods in cooling mode and charging mode to those which are prescribed, namely to being arranged, in cooling mode, to cool the indoor environment with cold from the rock store as the sole cold source, and to being arranged, in charging mode, to cool the rock store with cold outside air and/or ground cold as the sole cold source. Within these limitations, the present invention does however cover a number of different embodiments.

According to one embodiment of the invention, the cooling system is configured without control with the aid of feedback concerning the prevailing temperature of the indoor environment to be cooled. Instead, a temperature of the cooling medium is chosen which is assumed to produce a desired cooling, and cooling medium with such a temperature is conveyed to the indoor environment to be cooled, for example to a cooling heat exchanger device. It may be possible to set the system such that the chosen temperature is kept constant. One advantage with this embodiment is that the system becomes even simpler and more robust by virtue of simple control without a control system comprising regulation with the aid of feedback of the temperature of the indoor environment in question. This embodiment is especially advantageous in houses having a large number of cooling heat exchanger devices, for example office premises having one or more cooling heat exchanger devices in each room, since regulating and measuring equipment in each office room can then be avoided.

According to the invention, the cooling medium can be given the chosen temperature in any chosen suitable manner, for example by mixing the cooling medium which is conveyed for cooling with recirculated cooling medium heated by the indoor environment.

According to one embodiment of the invention, the predetermined temperature of the cooling medium which is conveyed to the indoor environment for cooling of the same is chosen at least 19° C. and no higher than 23° C. Any cooling heat exchanger device which is disposed in the house thus also acquires an average temperature of at least 19° C. and no higher than 24° C. Since, according to the thermodynamics, it is not possible to cool anything to a temperature which is lower than the temperature of whatever is used for cooling, the indoor environment can thus never be colder than the chosen temperature. Hence, with this embodiment, there is advantageously no risk of the cooling becoming too strong, or, in other words, of the indoor environment becoming too cold. This is possible even in embodiments which have no feedback. In order to obtain a desired cooling effect, any cooling heat exchanger device can be dimensioned correspondingly large in area to a conventional device which is fed with lower temperatures of the cooling medium in question.

A further advantage with the relatively high conveyance temperature of the cooling medium is that the cooling system according to this embodiment is especially suitable for use of a rock store as the cold source. With a high conveyance temperature of the cooling medium, the rock store can be allowed to be heated right up to 15-16° C. and nevertheless act as the cold source for a cooling medium which is to be cooled to the said 19-23° C., so that the preconditions are in place for the cold in the rock store to last throughout the season.

In particular, it is possible according to the invention to utilize the rock store when it has an average temperature of above 8° C. and below 16° C., preferably above 10° C. and below 15° C.

Unlike at least some embodiments of the invention, most known plants which are currently on the market operate with lower temperatures of the cooling medium (6-15° C.), comprise complex regulating systems with feedback (sometimes even from each room in the house) and must start to use additional cold from, for example, cooling machines for cooling the cooling medium to a desired level already when the rock store has an average temperature of 8-10° C.

According to one embodiment of the invention, the rock store is cooled in cooling mode no lower than to an average temperature of 5° C. By virtue of the fact that the cooling system according to the invention, in cooling mode, can use cooling medium at relatively high temperatures, a rock store which from the start has such a high temperature, compared with known rock stores for known plants, can last throughout the season. One advantage with this embodiment is that the rock store is not cooled to lower temperatures than the natural temperature of the rock, which is advantageous from an environmental viewpoint. It is also an advantage with respect to the capacity of the store to hold the cold. Since the store then has the same temperature as the surrounding rock, problems with cooling leaks from the store are avoided.

In this context, it is pointed out that the temperature of the rock store relates to an average temperature. The temperature in the rock store can vary in dependence on how close to the ground surface measurement is taken, or how close to that position in the rock store in which the rock store interacts with the cooling medium for transfer of cold to the cooling medium measurement is taken. If the rock store is of the type which comprises boreholes with liquid-filled lines, the temperature in the rock store can also vary in dependence on how close to a borehole measurement is taken. The average temperature thus relates to an average of many different temperatures in the rock store which are measured in many different representative positions distributed throughout the rock store.

According to one embodiment of the invention, the rock store is divided into a first and a second partial rock store, which are separated from each other. This is advantageous, since the plant then has two separate rock stores available for cooling, which makes it possible to first use cold from a first partial rock store and, after it has been heated up, to use cold from the second partial rock store. The result is that it is possible to fetch cold from a rock store with low temperature for a longer time, or, in other words, two smaller partial rock stores advantageously make it possible to hold a high cooling effect for longer than can be achieved by a single, large rock store. For corresponding reasons, it is also easier to charge two smaller partial rock stores with cold than one large rock store. It is also possible to divide the rock store into more than two partial rock stores.

According to the invention, the partial rock stores can be wholly separate without contact with one another, or can be connected and/or connectable to one another. The partial rock stores can be connected to one another such that the cooling medium comes into contact with both partial rock stores or such that a storage fluid flows through both partial rock stores. The partial rock stores can be connected in series or in parallel with respect to, for example, the flow path of the cooling medium or of the storage fluid.

According to one embodiment of the invention, a cooling medium heated by the indoor environment can be connected in cooling mode such that it first passes through a heated partial rock store, for example a partial rock store with an average temperature of 15° C., for a first cooling, and thereafter continues to a cold partial rock store which holds a lower temperature, for example above 5° C., for further cooling. The cooling medium passes through the partial rock stores in series.

Correspondingly, the cooling medium, in storage mode, can first pass through the first partial rock store for cooling thereof, and thereafter flow onwards to the second partial rock store, in which the cooling medium, somewhat heated by the first partial rock store, cools the second partial rock store. The cooling medium passes through the partial rock stores in series. Once the first partial rock store has been cooled in this way to a desired temperature, for example 5° C., the cooling medium can made to bypass the first partial rock store and, from then on, can only cool the second partial rock store until it acquires a desired temperature, for example 5° C.

According to another embodiment of the invention, in cooling mode a storage liquid can be connected such that it flows from a heated partial rock store, for example a partial rock store with an average temperature of 15° C., to a second, cold partial rock store which holds a lower temperature, for example above 5° C., for cooling. The storage liquid flows through the partial rock stores in series. The cooling medium is than arranged to pass through the storage liquid cooled by both partial rock stores, for cooling with cold from both the first and the second partial rock store. Correspondingly, the storage liquid can be arranged to, during charging, flow through both partial rock stores in series or through only one of the partial rock stores.

According to one embodiment of the invention, the cooling medium is the same as the storage fluid/the storage liquid. In such embodiments, the storage heat exchanger device can be dispensed with and the same liquid can flow both in at least parts of the cooling system and in the store.

BRIEF DESCRIPTION OF THE DRAWINGS

The invention will be described in greater detail below with the aid of illustrative embodiments and with reference to the appended drawing.

DESCRIPTION OF PREFERRED EMBODIMENTS

Figure 1:
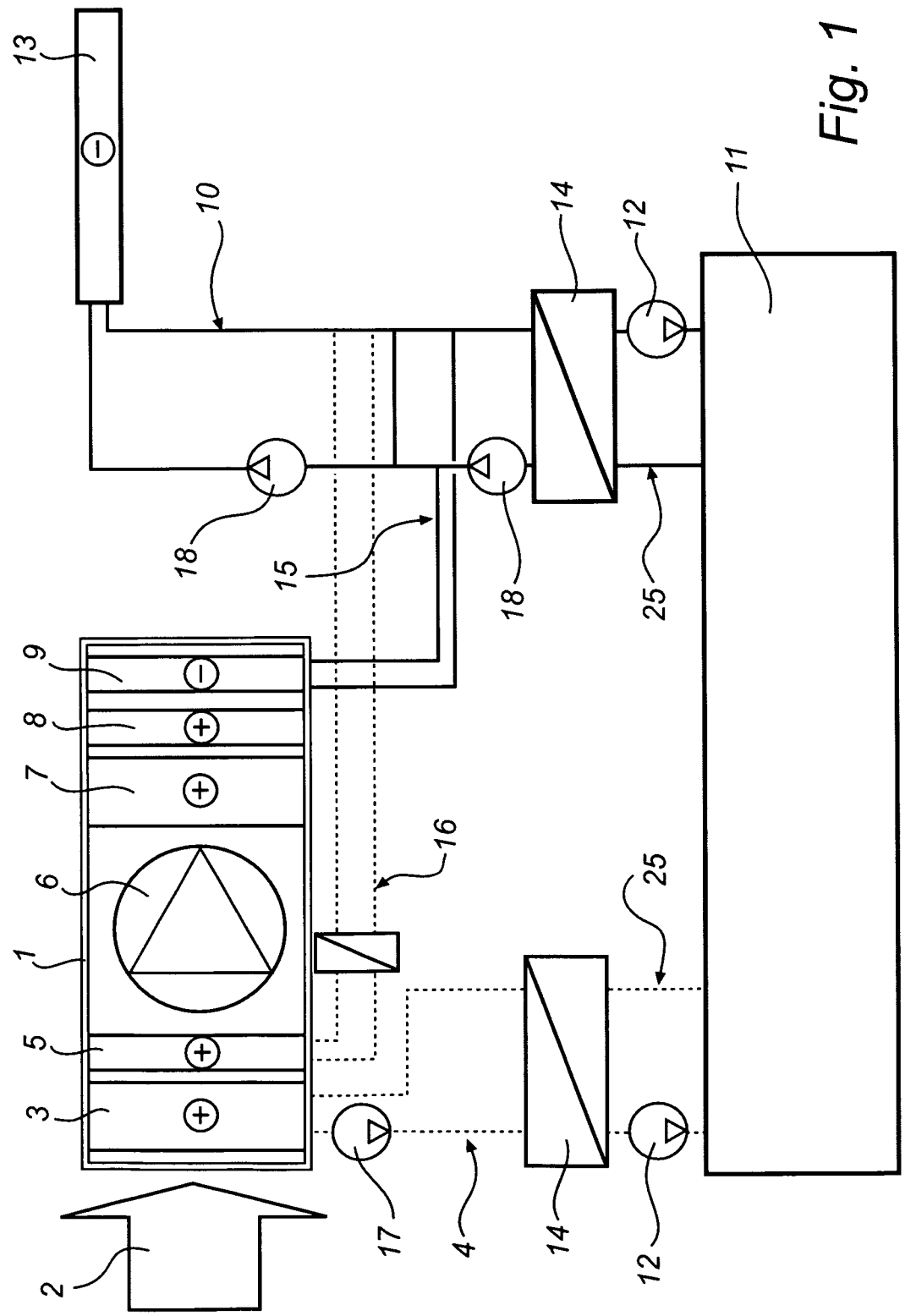
FIG. 1 is a schematic view of the method and the plant according to the invention according to a first embodiment, in cooling mode.
Figure 2:
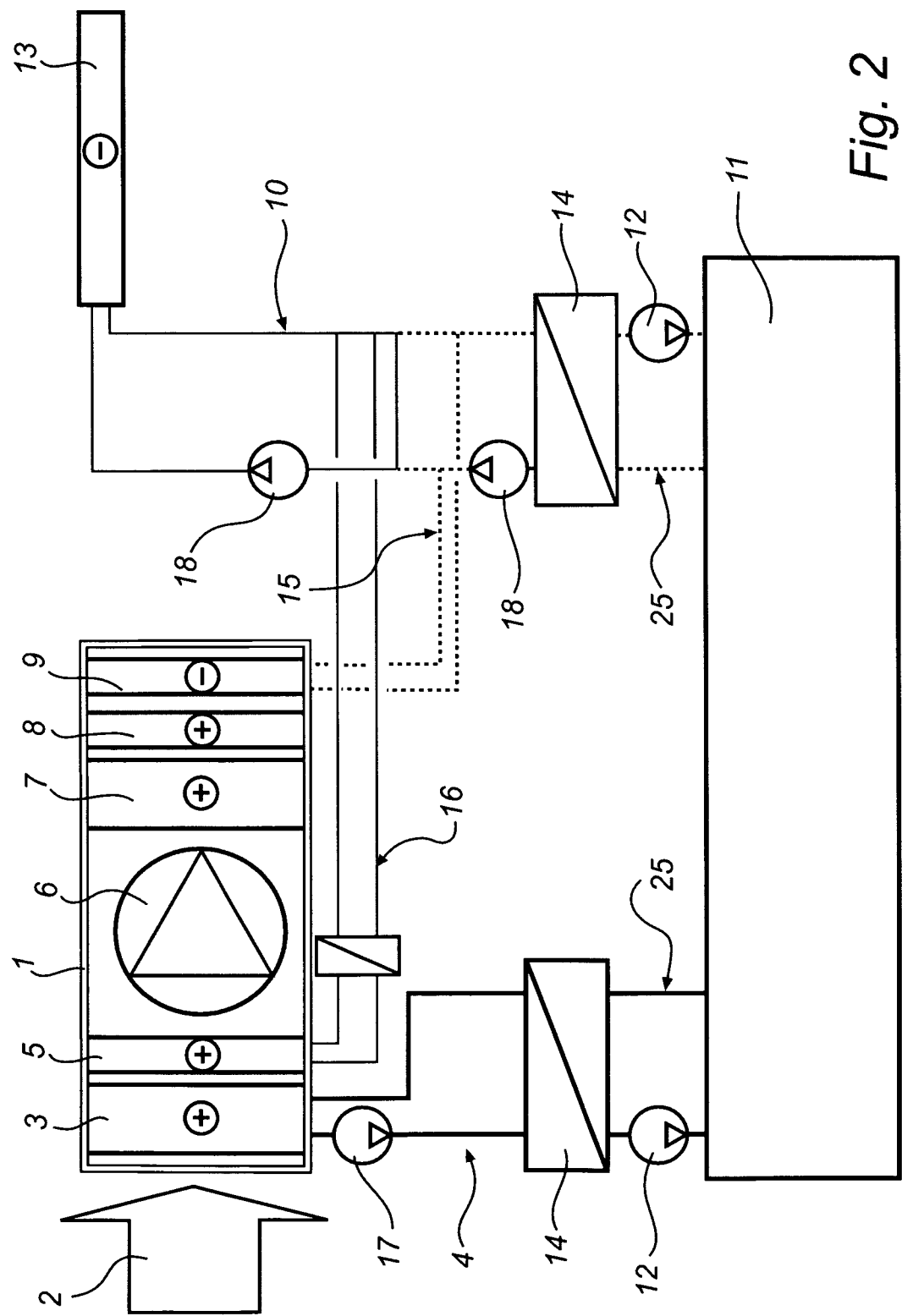
FIG. 2 is a schematic view of the method and the plant according to the invention according to the first embodiment, in charging mode.
Figure 7:
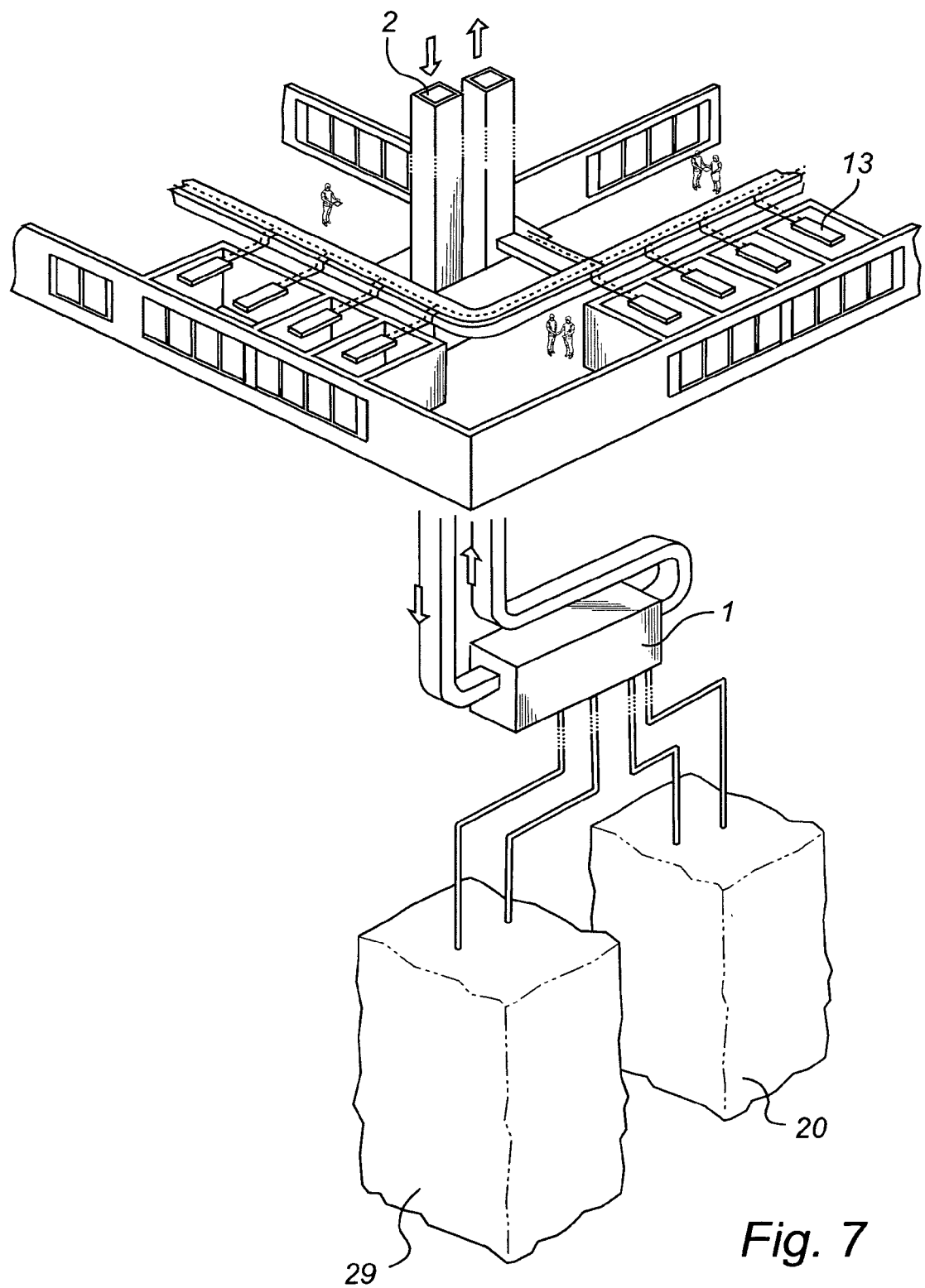
FIG. 7 is a schematic view of the plant according to the invention according to the first embodiment.

In FIGS. 1, 2 and 7, a first embodiment of the method for cooling an indoor environment and of a cooling plant for cooling an indoor environment, according to the invention, are shown schematically. The plant comprises an air treatment unit 1 for outside air 2, which in the shown embodiment also acts as ventilation air. The air treatment unit 1 is provided with a first heat exchanger device in the form of a charging heat exchanger device 3.

A cooling medium in the form of water with additives of anti-freeze passes through the charging heat exchanger device 3 when it circulates in a charging circuit 4. In the shown embodiment, the charging heat exchanger device 3 is a heater battery for transferring cold from the outside air 2 to the cooling medium.

In the air treatment unit 1, after the charging heat exchanger device 3 in the flow direction of the outside air 2, there is arranged a heat exchanger device in the form of an auxiliary cooling heat exchanger device 5. In the shown embodiment, the auxiliary cooling heat exchanger device 5 is a heater battery of the same type as the charging heat exchanger device 3. In the auxiliary cooling heat exchanger device 5, in wintertime cold from cold incoming outside air 2 is transferred to the cooling medium for possible cooling of the indoor environment even when the invention is in charging mode.

In the air treatment unit 1, after the auxiliary cooling heat exchanger device 5 in the flow direction of the outside air 2, there is arranged a fan 6. The fan 6 drives the intake of outside air for cooling of the rock store and the intake of outside air as ventilation air.

In the air treatment unit 1, after the fan 6 in the flow direction of the outside air 2, there is arranged a recovery heat exchanger device 7. In the recovery heat exchanger device 7, incoming ventilation air is in wintertime heated from outgoing ventilation air. The outgoing ventilation air passes through a heat exchanger device (not shown) in the form of a heater battery of the same type as the recovery heat exchanger device 7, in which the warm outflowing ventilation air transfers heat to a heat-carrying medium. The heat-carrying medium flows in a circuit (not shown) to the recovery heat exchanger device 7, in which it transfers heat to the incoming ventilation air 2. The recovery heat exchanger device 7, too, is in the form of a heater battery.

In the air treatment unit 1, after the recovery heat exchanger device 7 in the flow direction of the outside air 2, there is arranged a heating element 8 for further heating, if necessary, of incoming outside air. In the shown embodiment, the heating element 8, too, is a heater battery.

In the air treatment unit 1, last in the flow direction of the outside air 2, there is arranged a heat exchanger device in the form of a ventilation air heat exchanger device 9. The cooling medium can be made to pass through the ventilation air heat exchanger device 9 when it circulates in a cooling circuit 10. In the shown embodiment, the ventilation air heat exchanger device 9 is a cooling battery for transferring cold from the cooling medium to incoming ventilation air from the outside air 2.

The plant further comprises a cold store in the form of a rock store 11. The rock store 11 is a borehole store and comprises a plurality of boreholes. The boreholes are provided with tubes in which a storage fluid in the form of water without added anti-freeze circulates in a storage circuit 25.

In the shown embodiment, the rock store 11 is divided into a first partial rock store 19 and a second partial rock store 20, cf. FIGS. 3-7. The partial rock stores 19, 20 each comprise a respective partial rock storage circuit (not shown) and two common storage heat exchanger devices 14 (not shown in FIGS. 3-6) for transferring cold to, and respectively receiving cold from, the cooling medium.

The storage circuit 25 is driven by first and second pumps 12 and comprises heat exchanger devices 14 for transferring cold to and receiving cold from the cooling medium. The shown illustrative embodiment has two heat exchanger devices 14, but other embodiments can have a common heat exchanger device 14 for the charging circuit 4 and the cooling circuit 10.

The plant further comprises a cooling heat exchanger device 13, which is installed in the house in which the indoor environment is to be cooled. The cooling heat exchanger device is in the form of a cooling battery and transfers cold from the cooling medium to the air in the indoor environment. FIG. 7 shows how many cooling heat exchanger devices 13 are installed in office rooms in an office premises.

The plant thus comprises a charging circuit 4, in which the cooling medium circulates from the charging heat exchanger device 3 to one of the heat exchanger devices 14 of the storage circuit and back again. The charging circuit 4 is driven by a pump 17.

The plant also comprises a cooling circuit 10, in which the cooling medium circulates from the cooling heat exchanger device 13 to one of the heat exchanger devices 14 of the storage circuit and back again. The cooling circuit 10 has a first branch 15, which can be connected to or disconnected from the cooling circuit 10. In the first branch 15, cooling medium circulates to and from the ventilation air heat exchanger device 9 for cooling of incoming ventilation air by means of the cooling medium when the plant is in cooling mode. The cooling circuit 10 has a second branch 16, which can be connected to or disconnected from the cooling circuit. In the second branch, cooling medium flows to and from the auxiliary heat exchanger device 5 for transferring cold from cold incoming outside air 2 to the cooling medium (via a heat exchanger device) for possible cooling of the indoor environment even when the invention is in charging mode. The cooling circuit 10 and its branches 15, 16 are driven by pumps 18.

Finally, the plant comprises a valve mechanism, which comprises a plurality of valves for controlling the flow paths of the cooling medium. The plant also comprises a control device (not shown) for controlling the valves, which in the shown illustrative embodiment operates without feedback of the prevailing temperature of the indoor environment to be cooled.

The invention will be described in greater detail below by a description of a method for cooling an indoor environment with the aid of the plant.

The cooling plant according to the invention has only one cooling mode and only one charging mode. The sole cooling mode of the method and of the plant is described with reference to FIGS. 1, 3 and 4.

The plant is in cooling mode when it is warm outside and cooling of the indoor environment is desired, which is often during the summer season, at least in daytime. In this case, the outside air holds a temperature which is higher than that which is desired in the indoor environment.

Figure 3:
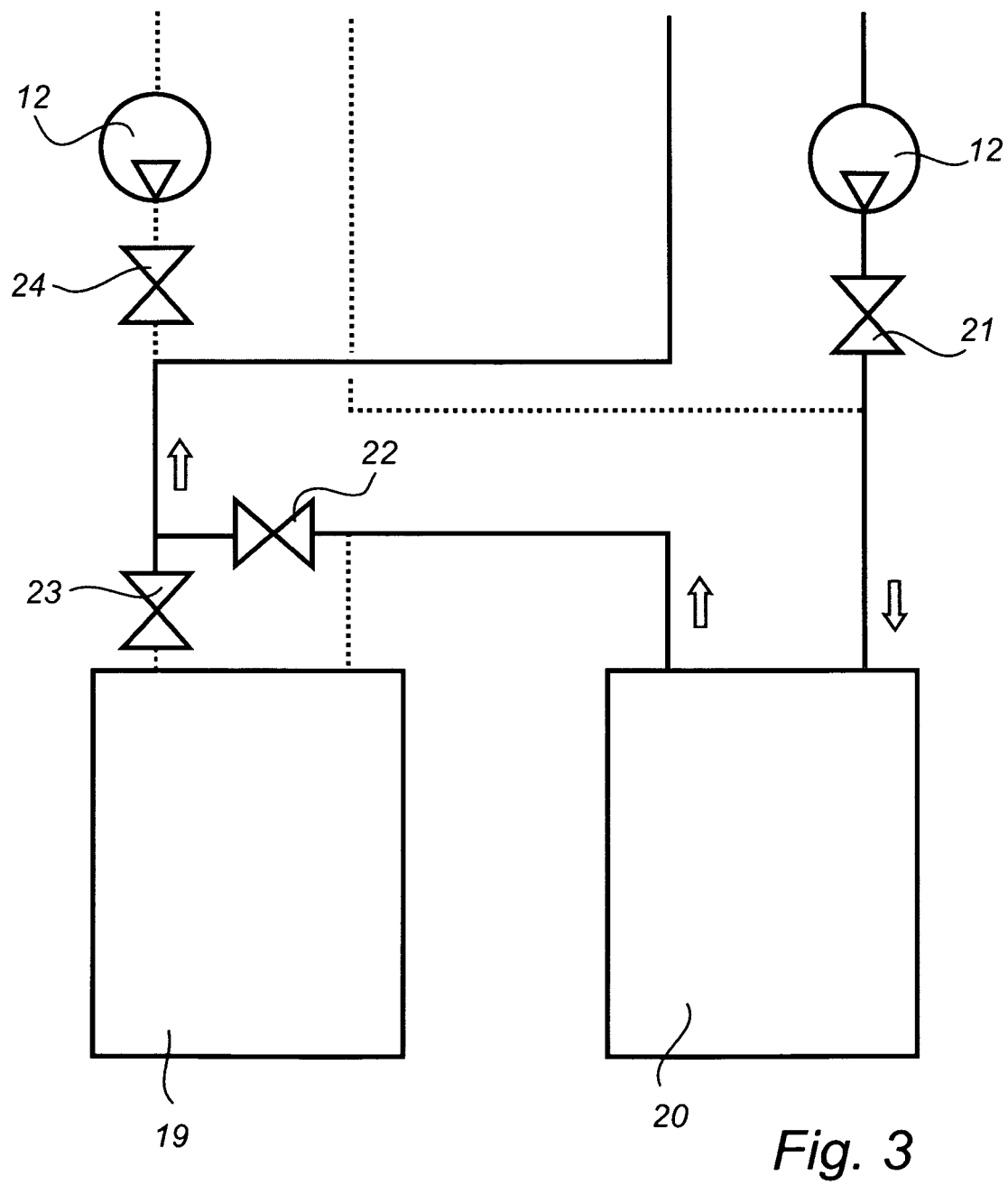
FIG. 3 is a schematic view of a part of the method and the plant according to the invention according to the first embodiment having a first and a second partial rock store in cooling mode, wherein both partial rock stores are cold.

Reference is first made to FIG. 3, which shows a part of the storage circuit 25 when the invention is in its sole cooling mode. At the start of the season, both the first and the second partial rock store are cold and have a temperature of about 5° C. (natural temperature). As is shown in FIG. 3, at the start of the season only the second partial rock store 20 is used and the first partial rock store 19 is disconnected from the plant and is saved for use later in the season. By means of the pump 12, storage water which has passed through one of the storage heat exchanger devices 14 (FIG. 1) and has there been heated once it has cooled the cooling medium heated by the indoor environment, is pumped through a first valve 21 to the second partial rock store 20. The second partial rock store 20 cools the storage water during its passage through the second partial rock store 20. After this, the storage water flows through an open valve 22 and is forced past the first partial rock store 19 by a closed valve 23. The cooled storage water then flows back to the storage heat exchanger device 14 for cooling of the cooling medium. If the second partial rock store, and thus the storage water, has a temperature of 5° C., the cooling medium is cooled to about 7° C. in the storage heat exchanger device 14.

The cooling medium which has been cooled in this way only by the rock store, namely by the second partial rock store, is then conveyed to the cooling heat exchanger device 13, cf. FIG. 1. Before the cooling medium reaches the cooling heat exchanger device 13, the approx. 7° C. cold cooling medium is mixed with some of the cooling medium which has left the cooling heat exchanger device 13 and has been heated by the indoor environment in the cooling heat exchanger device 13. The cooling medium is mixed with so much heated, or, in other words, recirculated cooling medium that the cooling medium acquires a predetermined temperature of 20° C. This predetermined temperature is kept constant and the quantity of mixed-in recirculated cooling medium is adjusted as the second partial rock store 20 is heated. The cooling heat exchanger device 13 cooled by the cooling medium, depending on how warm the indoor environment is, can hold an average temperature of 21° C.

Figure 4:
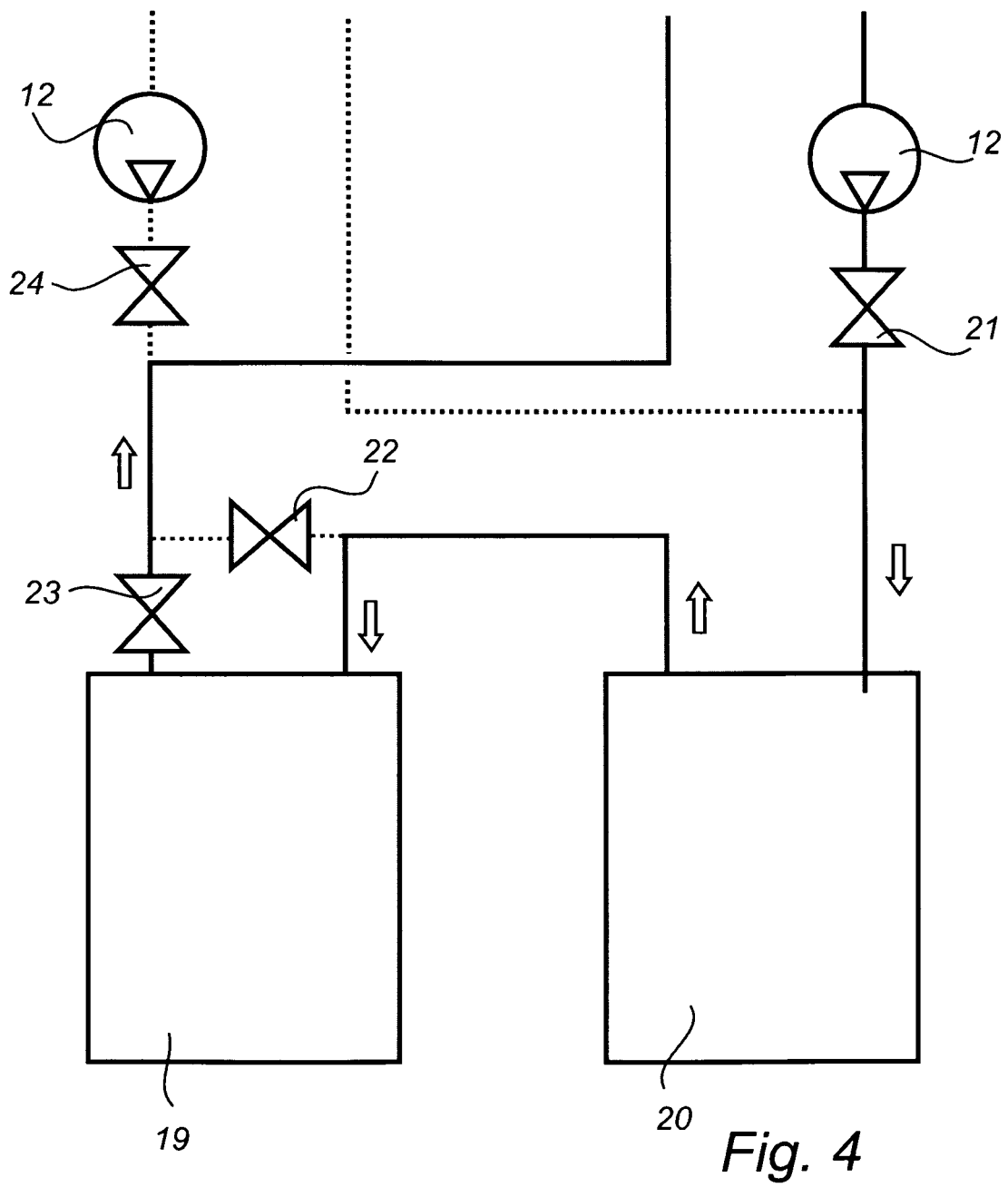
FIG. 4 is a schematic view of a part of the method and the plant according to the invention according to the first embodiment having a first, cold and a second, warm partial rock store, in cooling mode.

Later in the season, when the second partial rock store has been heated to 13°, the valve 22 is closed, so that the storage water is forced to pass through also the first partial rock store 19, cf. FIG. 4. The storage water then passes through the second and the first partial rock store 19, 20 in series. During its passage through the second partial rock store 20, the storage water is thus cooled to minimally that temperature which is also held by the second partial rock store, in this case 13° C. At the start, the first partial rock store holds 5° C., and is capable of cooling the 13-degree storage water to this temperature. The 5° C. cold storage water is capable of cooling the cooling medium in the storage heat exchanger device 14 to about 7° C. The 7-degree cooling medium which has been cooled in this way only by the rock store, namely by the second partial rock store 20 and the first partial rock store 19, then flows onwards towards the cooling heat exchanger device 13 and is given a desired predetermined temperature and cools the indoor environment in the same way as has been described above with reference to FIG. 1.

By virtue of the fact that the cooling heat exchanger is dimensioned to cool the indoor environment when it is fed with a temperature of the cooling medium which is above 19° C. and below 23° C., the cool store is not emptied until both the first and the second partial rock store have been heated to an average temperature of 15° C.

In the shown illustrative embodiment, in cooling mode, of the components of the air treatment unit 1, apart from the fan 6, only the ventilation air heat exchanger device 9 and the first branch 15 of the cooling circuit 10 are connected up. The ventilation air heat exchanger device 9 cools incoming outside air 2 intended for ventilation air. The second branch 16 of the cooling circuit is disconnected.

The sole charging mode of the method and of the plant is described below with reference to FIGS. 2, 5 and 6.

The plant is in charging mode when it is cold outside, so that a rock store which has been heated during the summer season can be cooled for possible reuse in the next summer season. Usually the plant is in charging mode during the winter season, when the outside air is colder than the heated rock store or colder than a desired temperature of a rock store charged with cold. No cooling of the indoor environment is then normally required.

Figure 5:
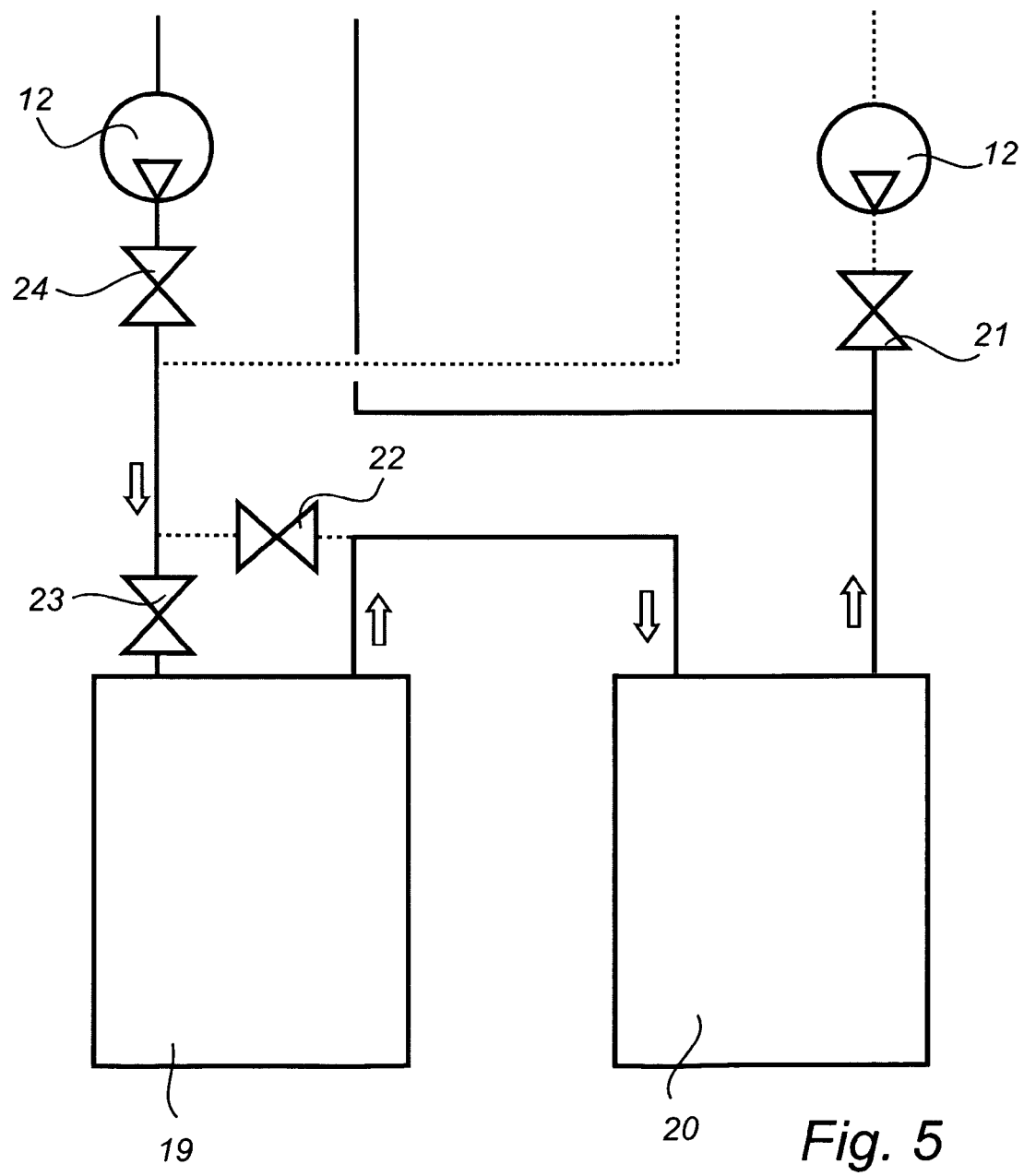
FIG. 5 is a schematic view of a part of the method and the plant according to the invention according to the first embodiment having a first and a second partial rock store, in charging mode, wherein both partial rock stores are warm.
Figure 6:
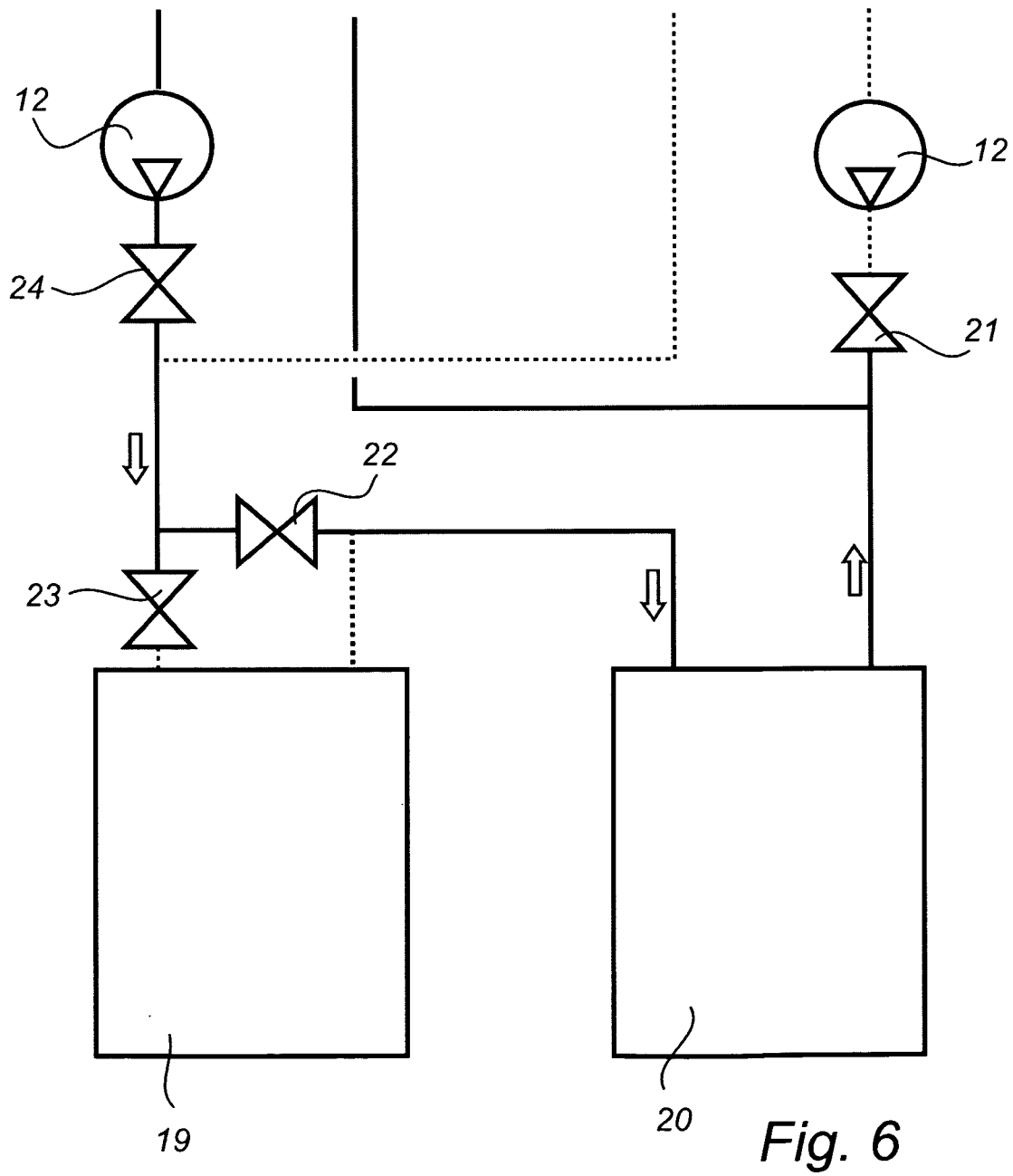
FIG. 6 is a schematic view of a part of the method and the plant according to the invention according to the first embodiment having a first, cold and a second, warm partial rock store, in charging mode.

Reference is first made to FIG. 5, which shows a part of the storage circuit 25 when the invention is in its sole charging mode. At the start of the winter season, both the first and the second partial rock store 19, 20 have been heated and have an average temperature of 15° C. In the charging heat exchanger device 3 (FIG. 2), the cooling medium is cooled by the cold outside air 2. The cooling medium which has in this way been cooled by only the outside air is pumped by the pump 17 to a storage heat exchanger device 14, in which it transfers cold to the storage water. The cooling medium heated by the warm storage water then flows back to the charging heat exchanger device 3 and thus circulates in the charging circuit 4.

The cooled storage water flows from the storage heat exchanger device 14 through an open valve 24 in the valve mechanism to the first partial rock store 19. During its passage through the first partial rock store 19, the storage water cools the first partial rock store. After this, the storage water flows onwards to the second partial rock store 20 and cools this also. The storage water thus passes through the first and the second partial rock store 19, 20 in series. The storage water heated by the warm rock store then flows back to the storage heat exchanger device 14 and thus circulates in the storage circuit 25.

With a temperature of 2° C., the cooling medium is capable of cooling the storage water to 5° C. and the first partial rock store 19 hence gradually acquires an average temperature of 5° C., which is the temperature which the rock store 11 naturally holds. Since the second partial rock store 20 is cooled with storage water which has been heated up by the first partial rock store 19, the second partial rock store 20 will be cooled more slowly. The second partial rock store 20 will hence have a higher temperature than a desired 5° C. when the first partial rock store 19 reaches this temperature. Then, with reference to FIG. 6, the first partial rock store 19 is disconnected from the storage circuit. Storage water which has been cooled by cooling medium, which, in turn, has been cooled only by outside air in the charging heat exchanger device 3, is then pumped by a pump 12 past the closed valve 23 and through the open valve 22 direct to the second partial rock store 20, without passing through the first partial rock store 19. There, cold storage water at 5° C. can then cool the second partial rock store 20 the remaining degrees to 5° C.

In the shown illustrative embodiment, in charging mode, of the components of the air treatment unit 1, apart from the fan 6, also the auxiliary cooling heat exchanger device 5 for transferring cold from cold incoming outside air 2 to the cooling medium for cooling of, especially, warm indoor environment, for example server rooms, is operating. In the shown example, the second branch 16 of the cooling circuit is accordingly connected to the cooling circuit. The recovery heat exchanger device 7, which heats incoming ventilation air with heat from outflowing ventilation air, is also in operation, as are heating elements 8 for further heating of incoming outside air 2. The first branch 15 and the ventilation air heat exchanger device 9 of the cooling circuit are disconnected.

In the described method and the described device according to the invention, no cooling medium is used which has been cooled in a different manner to that described. In the described method and the described device according to the invention, no cooling machines or air conditioning units are used.

The invention claimed is:

1. A method for cooling an indoor environment in a house with the aid of a cooling plant comprising a cold store in the form of a rock store, a cooling system for cooling the indoor environment and a cooling medium for transport of cold, the cooling plant having only one cooling mode and only one charging mode, comprising the steps of,
   in a cooling mode,
      cooling the cooling medium with cold from the rock store via a first storage heat exchanger device,
      feeding the cooling system only with cooling medium cooled only with cold from the rock store,
   in a charging mode,
      cooling the cooling medium only with outside air and/or ground cold, and
      cooling the rock store only with the cooling medium cooled only by outside air and/or ground cold via a second storage heat exchanger device.

2. The method according to claim 1, further comprising the step of, in the cooling mode, in the cooling system, conveying to the indoor environment to be cooled the cooling medium which holds a temperature for cooling of the indoor environment without feedback of the prevailing temperature of the indoor environment.

3. The method according to claim 2, further comprising the step of, in the cooling mode, regulating the temperature of the cooling medium to the temperature by recirculating cooling medium heated by the indoor environment.

4. The method according to claim 2, wherein the temperature of the cooling medium is above 19° C. and below 23° C.

5. The method according to claim 1, wherein the step of, in the charging mode, cooling the cooling medium only with outside air and/or ground cold comprises the step of cooling the cooling medium to a temperature of no lower than 2° C.

6. The method according to claim 1, further comprising the step of, in the charging mode, ceasing to cool the rock store once the rock store has acquired an average temperature of no lower than 5° C.

7. The method according to claim 1, wherein the step of, in the cooling mode, cooling the cooling medium with cold from the rock store comprises the step of cooling the cooling medium with cold from the rock store when the rock store has an average temperature of above 8° C. and below 16° C.

8. The method according to claim 1, further comprising the step of dividing the rock store into a first partial rock store and a second partial rock store separated from the first partial rock store.

9. The method according to claim 8, wherein the step of, in the cooling mode, cooling the cooling medium with cold from the rock store comprises the step of cooling the cooling medium with cold from the second partial rock store, and the step of feeding the cooling system only with the cooling medium cooled only with cold from the rock store comprises the step of feeding the cooling system only with the cooling medium cooled only with cold from the second partial rock store.

10. The method according to claim 8, wherein the step of, in the cooling mode, cooling the cooling medium with cold from the rock store comprises the step of cooling the cooling medium with cold from the second partial rock store and with cold from the first partial rock store.

11. The method according to claim 9, wherein the step of cooling the cooling medium with cold from the second partial rock store and with cold from the first partial rock store is performed if the second partial rock store has an average temperature of above 10° C.

12. The method according to claim 8, wherein the step of, in the charging mode, cooling the rock store only with the cooling medium cooled only by outside air and/or ground cold comprises the step of cooling the first partial rock store and the second partial rock with the cooling medium cooled only by outside air and/or ground cold.

13. The method according to claim 8, wherein the step of, in the charging mode, cooling the rock store only with the cooling medium cooled only by outside air and/or ground cold comprises the step of cooling only the second partial rock store with the cooling medium cooled only by outside air and/or ground cold.

14. The method according to claim 13, wherein the step of, in the charging mode, cooling the rock store only with the cooling medium cooled only by outside air and/or ground cold comprises the step of cooling only the second partial rock store with the cooling medium cooled only by outside air and/or ground cold, which is performed if the first partial rock store has an average temperature of 8° C.-10° C.

15. A cooling plant for cooling an indoor environment in a house, which cooling plant has only one cooling mode and only one charging mode, comprising a cooling system, a cold store in the form of a rock store, and a cooling medium for transport of cold, the cooling plant being arranged such that, in a cooling mode,
the cooling medium is exposed to cold only from the rock store for cooling of the cooling medium,
the rock store is connected, via a first storage heat exchanger device, to the cooling system for transport of only cooling medium cooled only by the rock store from the rock store to the cooling system for cooling of the indoor environment, in a charging mode,
the cooling medium is exposed to cold from only outside air and/or ground for cooling of the cooling medium, and
the rock store is connected, via a second storage heat exchanger device, to the cooling medium cooled by cold from only the outside air and/or the ground, for transport of only the cooling medium cooled by cold from only the outside air and/or the ground to the rock store for cooling of the rock store.

16. The cooling plant according to claim 15, wherein the cooling system comprises a cooling heat exchanger device for transferring cold from the cooling medium to air for cooling of the indoor environment, which cooling heat exchanger device has an average temperature of above 19° C. and below 24° C.

17. The cooling plant according to claim 16, wherein the cooling heat exchanger device is arranged to be detachably installed in the indoor environment of the house in question.

18. The cooling plant according to claim 15, wherein the cooling system comprises a charging heat exchanger device for transferring cold from the outside air to the cooling medium and/or for transferring cold from the ground to the cooling medium.

19. The cooling plant according to claim 15, wherein the cooling system comprises a cooling circuit, in which the cooling medium, in the cooling mode, circulates from the rock store to the cooling heat exchanger device and back to the rock store, and a charging circuit separate from the cooling circuit, in which the cooling medium, in the charging mode, circulates from the charging heat exchanger device to the rock store and back to the charging heat exchanger device.

20. The cooling plant according to claim 15, wherein the rock store has an average temperature of above 5° C. and below 16° C.

21. The cooling plant according to claim 15, wherein the cooling plant is arranged such that it allows cooling mode when the rock store has an average temperature of above 8° C. and below 16° C.

22. The cooling plant according to claim 15, wherein the rock store comprises a rock storage circuit, in which a storage liquid circulates, and the first storage heat exchanger device for transferring cold from the storage liquid to the cooling medium.

23. The cooling plant according to claim 15, wherein the rock store comprises a first partial rock store and a second partial rock store separate from the first partial rock store.

24. The cooling plant according to claim 23, wherein the first partial rock store comprises a first partial rock storage circuit, the second partial rock store comprises a second partial rock storage circuit, which first and second partial rock storage circuits are connected to the first storage heat exchanger device, and wherein the cooling system further comprises a valve mechanism for switching between a first position, in which the storage liquid passes through both the first and the second partial rock storage circuit in series, and a second position, in which the first partial rock storage circuit is disconnected such that the storage liquid passes only through the second partial rock storage circuit.

* * * * *